(12) United States Patent
Kim et al.

(10) Patent No.: US 7,508,838 B2
(45) Date of Patent: Mar. 24, 2009

(54) ETHERNET PORT APPARATUS SUPPORTING MULTIPLE PHYSICAL MEDIA, MEDIA MANAGING METHOD THEREFOR, AND SWITCHING SYSTEM USING THE SAME

(75) Inventors: Dae-Ub Kim, Daejon (KR); Tae-Sik Cheung, Daejon (KR); Bheom-Soon Joo, Daejon (KR); Hae-Won Jung, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 704 days.

(21) Appl. No.: 11/120,669

(22) Filed: May 2, 2005

(65) Prior Publication Data

US 2006/0120394 A1 Jun. 8, 2006

(30) Foreign Application Priority Data

Dec. 2, 2004 (KR) ...................... 10-2004-0100658

(51) Int. Cl.
*H04L 12/56* (2006.01)
(52) U.S. Cl. ......................... 370/419; 370/463; 713/300
(58) Field of Classification Search ...................... None
See application file for complete search history.

(56) References Cited

U.S. PATENT DOCUMENTS 6,507,591 B1 1/2003 Bray
2003/0179711 A1 9/2003 Huff

FOREIGN PATENT DOCUMENTS

KR 1020040027684 A 4/2004

*Primary Examiner*—Wing F Chan
*Assistant Examiner*—Brian Roberts
(74) *Attorney, Agent, or Firm*—Blakely, Sokoloff, Taylor & Zafman LLP (57) ABSTRACT

Provided is an Ethernet port apparatus supporting multiple physical media, a physical medium managing method, and a switching system using the same. The Ethernet port apparatus of the present research can use and manage multiple transmission media by freely selecting and exchanging the transmission media in a system using an Ethernet port. The Ethernet port apparatus supporting multiple physical media, which includes: a main board unit for supporting hot swap and power supply; a detachable physical medium-based sub-board unit for generating a control signal, transmitting the control signal to the main board means, performing a transceiving function suitable for the desired physical medium; and a physical medium support fixing unit for transmitting variable power, a power control signal, a physical medium control signal, a physical medium state information, and physical medium-dependent bitstream between the main board unit and the sub-board unit.

9 Claims, 6 Drawing Sheets

ETHERNET PORT APPARATUS SUPPORTING MULTIPLE PHYSICAL MEDIA, MEDIA MANAGING METHOD THEREFOR, AND SWITCHING SYSTEM USING THE SAME

FIELD OF THE INVENTION

The present invention relates to an Ethernet port apparatus supporting multiple media, a medium managing method therefor, and a switching system using the same. More particularly, the present invention relates to an Ethernet port apparatus supporting multiple physical media that can use and manage multiple transmission media by freely selecting and exchanging the transmission media with another one in a switching system using ports, such as switches and routers, a medium managing method therefor, and a switching system using the Ethernet port apparatus.

DESCRIPTION OF RELATED ART

The development of a giga-bit Ethernet and a 10 giga-bit Ethernet has expanded the application area of the Ethernet not only into a local area network (LAN) but also into a metropolitan area network (MAN). Particularly, the 10 giga-bit Ethernet makes the Ethernet provide even broader bandwidths to the MAN, and the demand for the LAN bandwidths increases day by day.

Conventional LAN is mostly formed of 10/100 Mbps copper media, and conventional MAN with a coverage of more than a few kilometers mainly uses a giga-bit Ethernet using optical cable. However, the increase in the demand for LAN bandwidths causes giga-bit Ethernet technology using copper and systems come to adopt the technology. Thus, the giga-bit Ethernet technology forms the mainstream of the Ethernet market due to its advantages that it can provide bandwidths broad enough to support the LAN and MAN that require broadbands and that the manufacturing cost based on the bandwidth is the most inexpensive at present.

Although the conventional Ethernet systems present a method for selecting an optical transceiver based on the transmission characteristics of optical cable and use the selected optical transceiver for a desired use, they fail to catch up with the advantages of the copper media in the respect of cost and convenience in the local area. In short, a switch or router system that selects copper as a medium in consideration of cost cannot be used in the MAN due to a problem in the transmission distance.

As described before, the conventional Ethernet systems have the system application range to be limited to any one among the LAN, MAN and Access by fixing and using a physical medium in a system designing step, or they adopt a method of forming a plurality of line cards and changing the entire line cards, thus raising the cost. Also, a conventional method of expanding the transmission distance and supporting a variable rate in copper by exchanging transmission wavelengths between optical modules has a limit in broadening the application range of the Ethernet system.

Therefore, it is required to develop technology that can overcome the limits and disadvantages of the conventional Ethernet systems by freely selecting, using and managing different types of transmission media in a packet switch or router system that uses Ethernet ports.

SUMMARY OF THE INVENTION

It is, therefore, an object of the present invention to provide an Ethernet port apparatus supporting multiple physical media that can use and manage multiple transmission media by freely selecting transmission media and exchanging the transmission media with another media in a system using an Ethernet port, a physical medium managing method therefor, and a switching system using the Ethernet port apparatus.

The other objects and advantages of the present invention will be able to be understood by the following description of the present embodiments. Also, it is apparent to those skilled in the art that the objects and advantages of the present invention can be realized easily by the elements claimed or combinations thereof.

In accordance with an aspect of the present invention, there is provided an Ethernet port apparatus supporting multiple physical media, which includes: a main board unit for supporting hot swap and power supply according to a physical medium among multiple physical media, and managing the state of the media and performing media exchange by collecting and managing transmission/reception characteristics and state of the physical medium; a detachable physical medium-based sub-board unit for generating a control signal based on the physical medium to determine a level of power, transmitting the control signal to the main board means, performing a transceiving function suitable for the physical medium desired by a system user, and informing the state of the physical medium to the main board means; and a physical medium support fixing unit for transmitting various levels of power, a power control signal, a physical medium control signal, a physical medium state information, and physical medium-dependent bitstream between the main board unit and the sub-board unit in order to support multiple physical media transmission interface.

In accordance with another aspect of the present invention, there is provided a switching system including an Ethernet port apparatus which supports multiple physical media, which includes: N Ethernet Media Access Control (MAC), which are switches or routers, N being an integer; N multiple physical layer devices; and a system managing unit for receiving information on a physical medium from the N multiple physical layer devices which perform media exchange based on physical layer state information and from the main board means, determining whether to operate the N multiple physical layer devices based on link state information of the N Ethernet MACs, and managing the physical medium and the state of the physical medium, wherein there are M detachable sub-board means, and each sub-board unit has 'N/M=L' ports, and a desired type of physical media is selected and used as many as the ports, L being a number of ports per module of a sub-board means, M being an integer and the number of sub-board unit that can be connected to one main board means, and N being a total number of ports supported by one main board means.

In accordance with another aspect of the present invention, there is provided a method for managing a physical medium in an Ethernet port apparatus supporting multiple physical media, which includes the steps of: a) monitoring a link state of each port of a sub-board means, a module attachment/detachment state, a type and state of a current physical medium, and whether the physical medium is exchanged with another physical medium and, if there is a change during the monitoring, checking the link state with the sub-board means; b) if the link with the sub-board unit is floating, checking whether the sub-board unit is detached from the main board means; c) if the sub-board unit is not detached from the main board means, determining there is no change in the physical medium and maintaining a double physical layer device; d) if the sub-board unit is detached from the main board means, waiting until the sub-board unit is attached again and, if there is a change in the state of the physical medium, requesting a system processor for switching of a double physical layer device or, if there is no change in the state of the physical medium, maintaining the double physical layer device the same; and e) if at least one link is fixed, maintaining the double physical layer device the same.

The present invention is applied to a switching system using a plurality of Ethernet ports, such as switches and routers. It freely selects, uses and manages a transmission medium, optical cable or copper cable, in the switching system using the Ethernet ports and also performs hot swap. In other words, a system user forms two different types of physical media, which are copper cable and optical cable, in the switching system that can include multiple Ethernet ports, upon a request from the user, and exchanges and substitutes the physical media flexibly with another media in the operation of the switching system.

For this, the present invention forms a sub-board in the form of an extended slot that supports a copper-type physical medium and a sub-board in the form of an extended slot that supports a PMD module of fiber, has a managing unit, a fixing unit, and a variable power source for managing and connecting sub-boards, and makes the user select and attach a desired medium to the multiple ports to thereby extend the application range of the system and exchange a medium which is not used during operation of the system with another medium by supporting a function of hot swap.

In the present invention, it is possible to set up two physical layer devices together by connecting a 1000BASE-X Physical Coding Sub-layer (PCS) device and a 1000BASE-T PCS device and support 10M/100M/1000M MAC simultaneously.

Since the present invention can support two different media simultaneously and the media can be exchanged with another medium, the user can apply a desired medium selectively so that it can include optical transceivers supporting a variety range of distances and copper supporting a wide range of rates as many as the ports in one system.

As described above, the present invention manages the two different media in the switching system, applies a desired medium selectively, and exchanges the media of the ports that do not attend the system operation. This is possible because the present invention makes it possible to select and set up the optical transceivers which support a diverse range of distances and copper which supports a wide range of rates in the system through the MAC of variable rates and optical transmission and reception of variable distances as many as desired by the user.

In particularly, the present invention focuses on the adaptation of physical media and it put more importance on technology of utilizing a media-dependent interface of copper and PMD and media-dependent interface of fiber among what is presented in the Institute of Electrical and Electronics Engineers (IEEE) 802.3.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter. Accordingly, the technological concept of the present invention will be realized easily by those of ordinary skill in the art. If it is determined that further description on prior art may blur the point of the present invention, it will not be provided. Hereinafter, preferred embodiments of the present invention will be described in detail with reference to the accompanying drawings.

Figure 1:
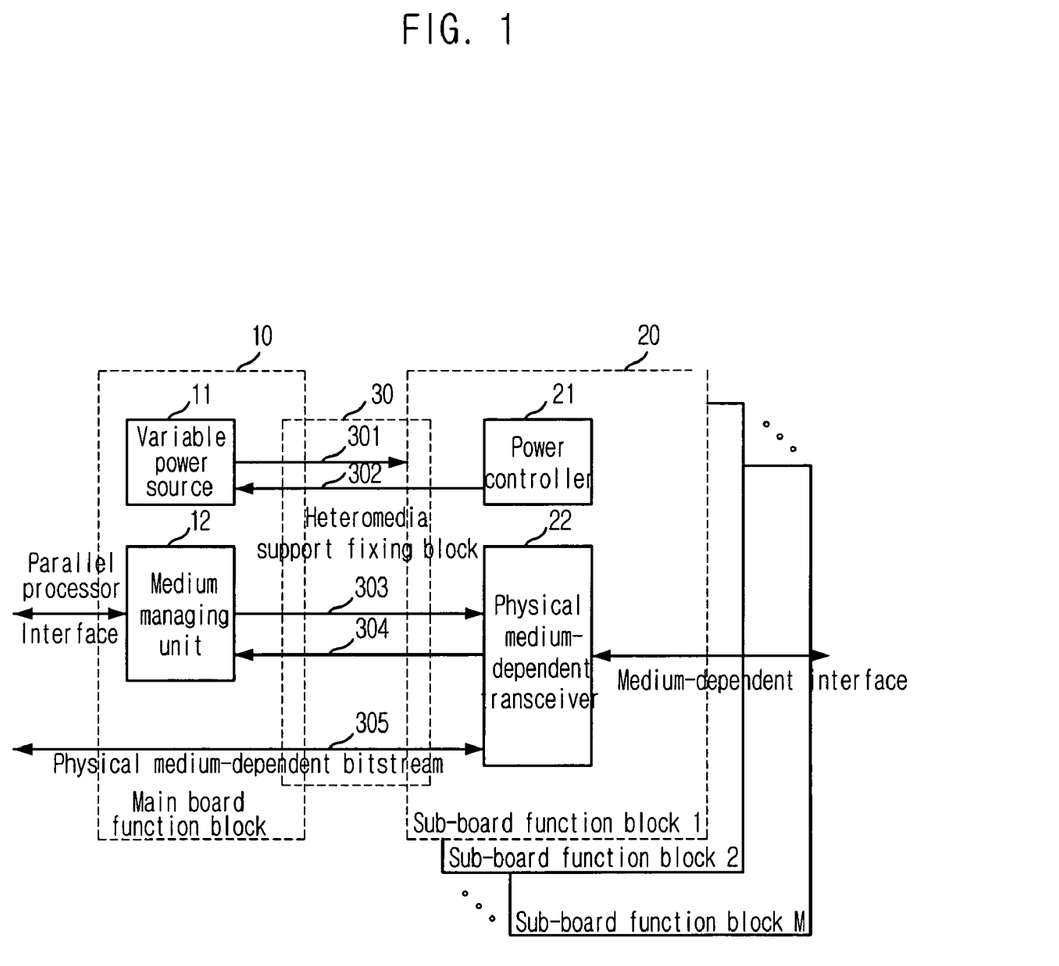
FIG. 1 is a block diagram showing an Ethernet port apparatus supporting multiple media in accordance with an embodiment of the present invention.

FIG. 1 is a block diagram showing an Ethernet port apparatus supporting multiple media in accordance with an embodiment of the present invention.

The Ethernet port apparatus supporting multiple physical media, which is suggested in the present invention, is applied to a switching system (see FIG. 2) that can include Ethernet ports, such as a switch and a router. The Ethernet port apparatus supporting multiple media can freely support copper cable as well as optical cable to broaden the applicability of the switching system.

The Ethernet port apparatus of the present invention includes a main board function block 10, a sub-board function block 20, and a heteromedia support fixing block 30. Differently from conventional Ethernet systems, the Ethernet port apparatus of the present invention can extend the coverage of the Ethernet system and change a physical medium transmission part in the middle of operation by forming the physical medium transmission part as a module.

As shown, the main board function block 10 supplies power source and supports hot swap based on a physical medium among the multiple physical media, and performs physical medium state management and media exchange by collecting and managing information on the state and transceiving characteristics of the physical medium. The sub-board function block 20 generates a control signal based on the physical medium and transmits the control signal to the main board function block 10 to thereby determine the level of the power source, performs the transceiving function suitably to the physical medium which is desired by a system user, and informs the state of the physical medium to the main board function block 10. The heteromedia support fixing block 30 transmits a variable power source, a power control signal, a physical medium control signal, physical medium state information, and physical medium-dependent bitstream between the main board function block 10 and the sub-board function block 20 to thereby support a multiple media transmission interface.

The main board function block 10 is provided with a variable power source 11 and a physical medium managing unit 12. Physical medium-dependent bitstream 305 is generated in double physical layer devices 43-1 and 43-2 of a system main board 40 (see FIG. 2) and supplied to a physical medium-dependent transceiver 22 of the sub-board function block 20 through the heteromedia support fixing block 30.

The variable power source 11 can supply power variably according to a physical medium. The variable power source 11 provides 2.5V or 3.3V based on a physical medium, and the variable power source 11 exists as many as the sub-board function block 20. In terms of hardware, the variable power source 11 can supply a proper level of power to the sub-board function block 20, as a power controller 21 of the sub-board function block 20 sends out a signal of a different level according to the physical medium. To be specific, the variable power source 11 supplies 2.5V when the physical medium of the sub-board function block 20 is copper, and it supplies 3.3V when the physical medium is optical cable.

The physical medium managing unit 12 is connected to a system processor 41 (see FIG. 2) and performs normal system operation. It monitors whether the sub-board function block 20 is attached or detached by managing the physical medium according to the kind of the physical medium, determines whether to exchange the double physical layer devices 43-1 and 43-2, and sends informations needed to operate the system to the system processor 41.

When the physical medium of the sub-board function block 20 is copper, a physical medium-dependent transceiver 22-1 (see FIG. 3A) simply performs a role of a signal repeater and thus the physical medium managing unit 12 does not transmit or receive any bitstream to or from the physical medium-dependent transceiver 22 in connection with the physical medium.

When the physical medium of the sub-board function block 20 is optical cable, the physical medium managing unit 12 transmits and receives optical transceiver control bitstream and optical transceiver state information bitstream to and from a physical medium-dependent transceiver 22-2 (FIG. 3B) in connection with the physical medium. Then, it receives bitstream related to a module, i.e., module attachment/detachment information bitstream and module physical medium type information bitstream, controls the optical transceiver to be turned on and off in the system management area based on the module attachment/detachment information bitstream, the module physical medium type information bitstream, the optical transceiver control bitstream, and the optical transceiver state information bitstream, detects an error in transmission and reception of the optical transceiver, and detects presence of an optical signal reaching the optical transceiver. The physical medium managing unit 12 can freely select and use a physical medium by managing the module attachment/detachment information and information on a present physical medium, which will be referred to as present physical medium information hereinafter, based on the module attachment/detachment information bitstream and the module physical medium type information bitstream, and informing the module attachment/detachment information and the present physical medium information to the system processor 41 to control the double physical layer devices 43-1 and 43-2.

Meanwhile, the sub-board function block 20 includes the power controller 21 and the physical medium-dependent transceiver 22.

The power controller 21 generates a control signal 302 for controlling the variable power source 11 to supply a proper level of power to the sub-board function block 20 according to the physical medium. In short, it determines a power level for the sub-board function block 20. The control signal 302 is defined as a module power control signal, and it is supplied to the variable power source 11 of the main board function block 10 through the heteromedia support fixing block 30. Herein, the module power control signal 302 varies a signal level according to a physical medium and makes hardware, i.e., the variable power source 11, generate a signal suitable for the physical medium.

The physical medium-dependent transceiver 22 performs a transceiving function suitable for the physical medium desired by the system user.

Specifically, the physical medium-dependent transceiver 22 has a different shape according to the type of the physical medium. Two different physical media 22-1 and 22-2 are shown in the present specification. The physical medium-dependent transceiver 22 is controlled by the physical medium managing unit 12 of the main board function block 10 and informs the physical medium managing unit 12 of the state of the physical medium. It receives physical medium-dependent bitstream 305 from the main board function block 10 and, if the physical medium is copper, it re-transmits the physical medium-dependent bitstream 305. Otherwise, if the physical medium is an optical transceiver, it transmits and receives an optical signal by performing optical-electric conversion.

The heteromedia support fixing block 30 is formed of the physical medium-dependent bitstream 305 transmitted from a double physical layer device 43 (see FIG. 2) to freely exchange the physical media with another media and an expansion connector which includes a sub-board power source 301, a module power control signal 302, a physical medium control signal 303, and a physical medium state information 304.

Figure 2:
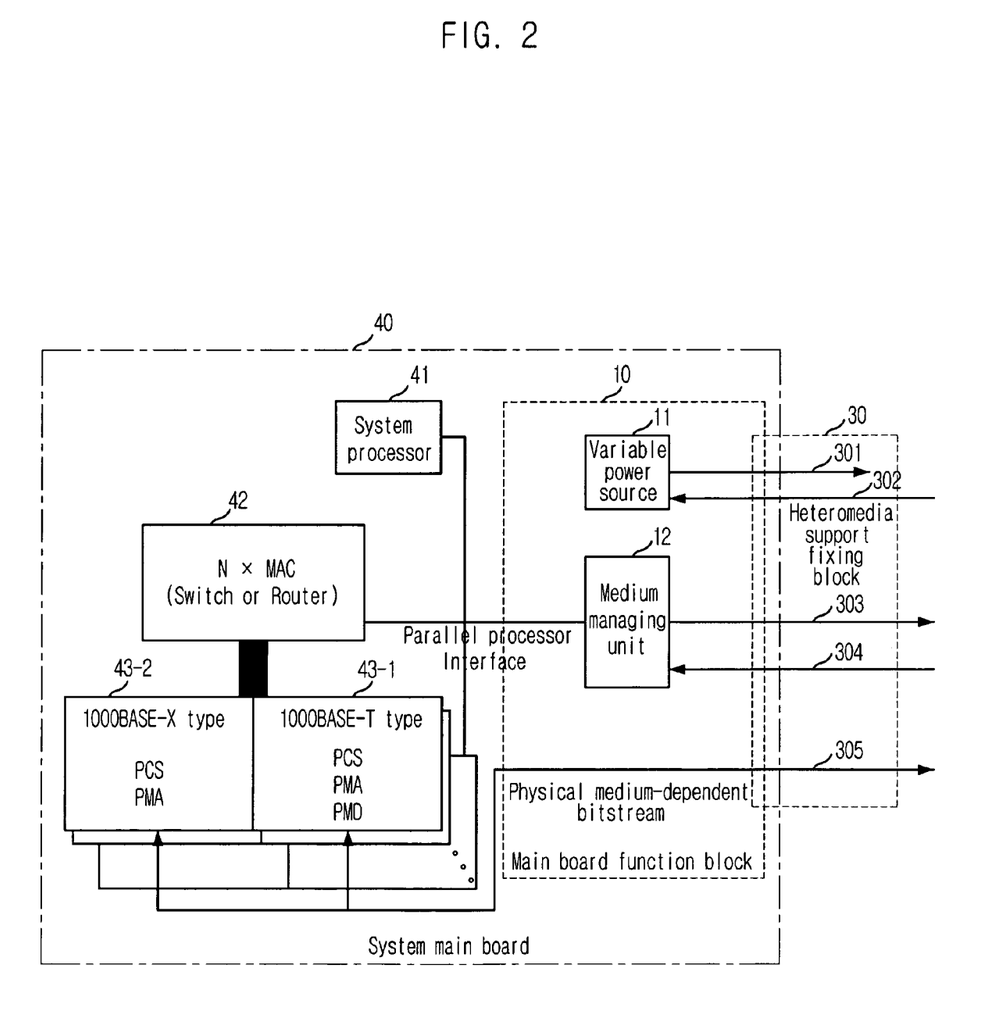
FIG. 2 is an exemplary block diagram illustrating a main board of a switching system where the Ethernet port apparatus supporting multiple physical media is applied.
Figure 3A:
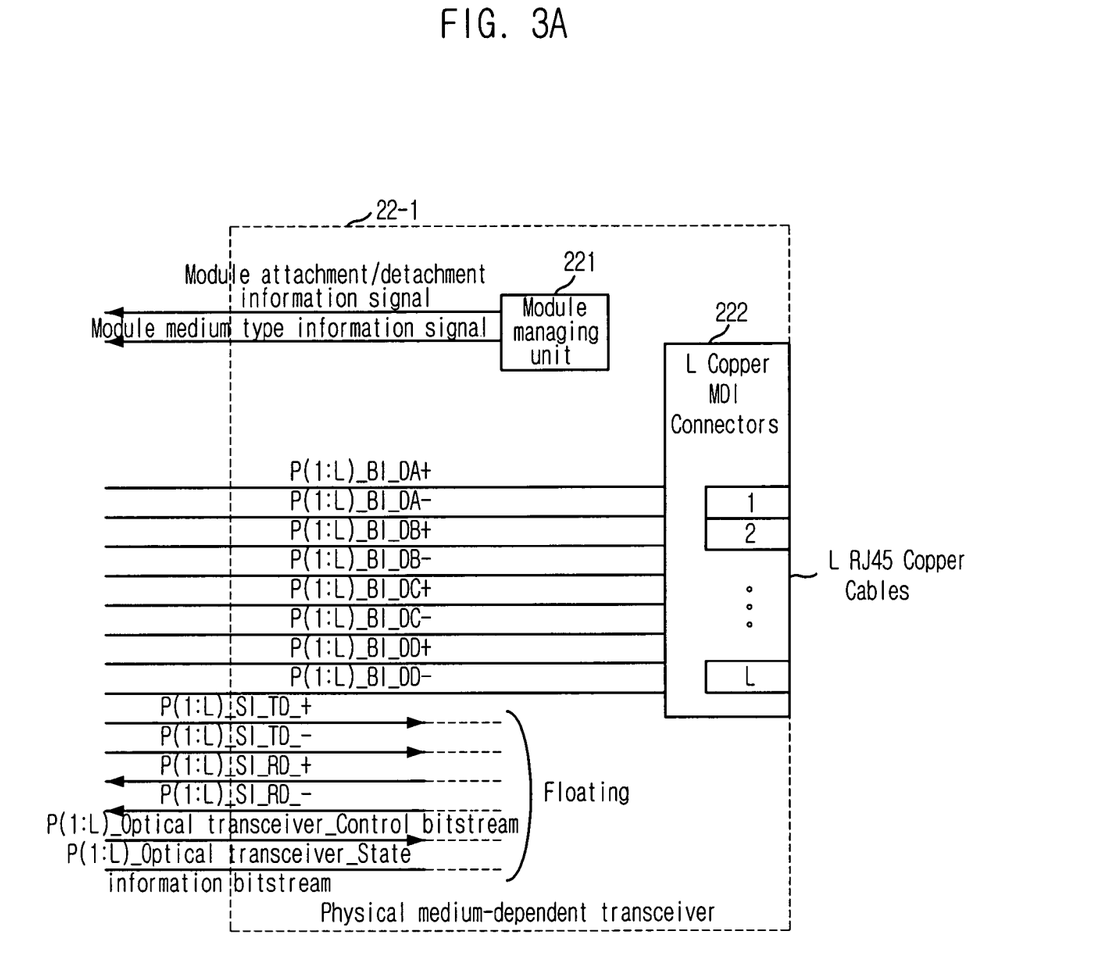
FIGS. 3A and 3B are diagrams describing physical medium-dependent transceivers for the Ethernet port apparatus supporting multiple physical media in accordance with an embodiment of the present invention.
Figure 3B:
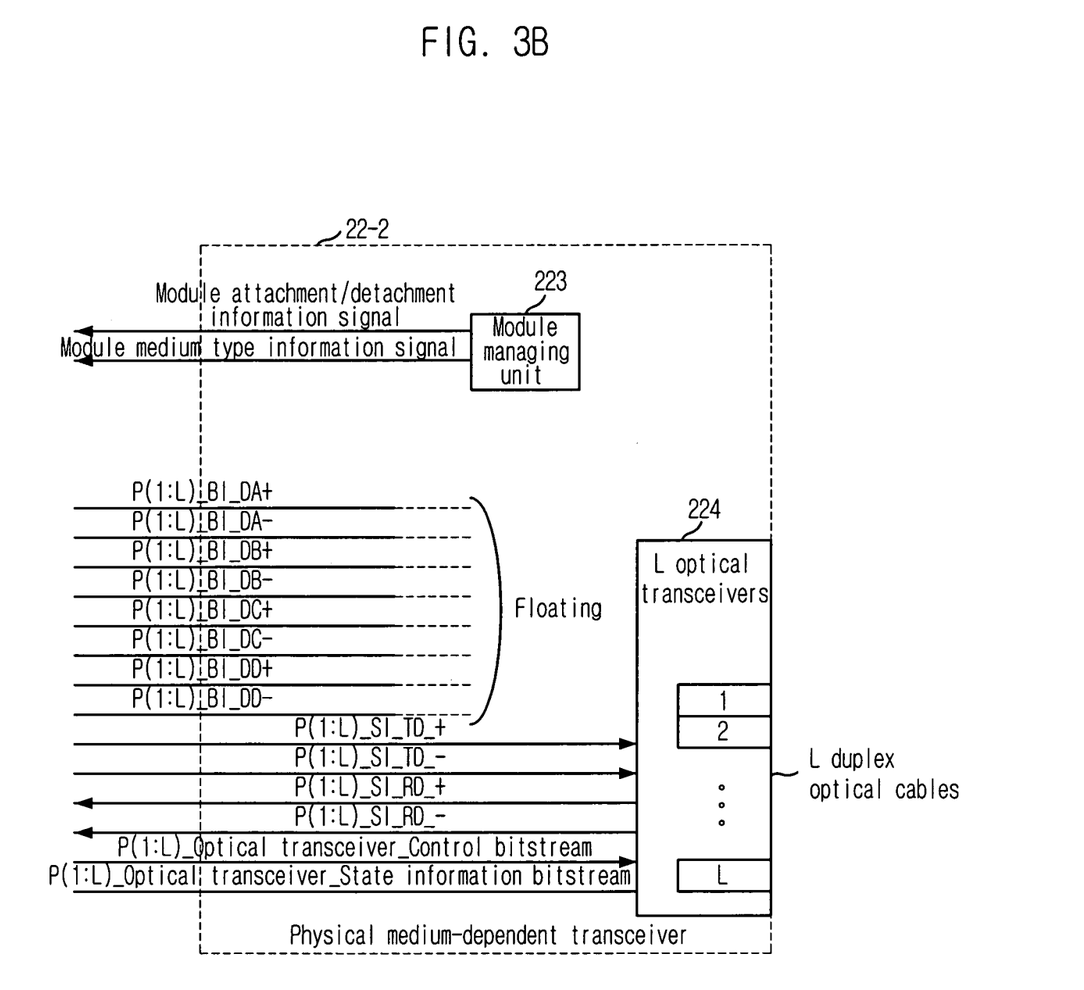

As illustrated in FIGS. 1 to 3, a main board function block 10 can have a plurality of sub-board function blocks 20.

As shown in FIG. 2, if the system main board 40 supports N Ethernet MACs 42, e.g., switches or routers, and the double physical layer devices 43-1 and 43-2, it is possible to set up N Ethernet ports in the system main board 40. When it is assumed that there are M sub-board function blocks 20, one sub-board function block 20 includes "N/M=L" ports. Thus, a user can select and use as many physical media as desired in one system by selecting and setting up sub-board function blocks 20 each having L copper physical medium ports, or sub-board function blocks 20, each having L optical cable physical medium ports, as many as desired. Herein, L denotes the number of ports per module in a sub-board function block 20 and M denotes the number of sub-board function blocks 20 that can be connected to a main board function block 10, while N denotes the total number of ports in one main board function block 10. The variables L, M and N are determined by a designer according to the usage area of a system.

Accordingly, a main board of the switching system using Ethernet ports, such as a switch or a router, includes a main board area of the Ethernet port apparatus supporting multiple media which is shown in FIG. 1, N Ethernet MACs 42 (N being an integer), e.g., switches or routers, N double physical layer devices 43-1 and 43-2, and a system processor 41. The system processor 41 receives information on the media from the N double physical layer devices 43-1 and 43-2 which perform media exchange based on the physical layer state information and the main board function block 10 and manages the medium state based on link state information of the N Ethernet MACs 42. When M detachable sub-board function blocks 20 are set up (M being an integer), each sub-board function block 20 includes 'N/M=L' ports. Therefore, it is possible to select desired physical media as many as the ports.

In other words, the switching system of the present invention, which is a switch or a router, includes the main board function block 10 of the Ethernet port apparatus supporting multiple media shown in FIG. 1, a main board area of the heteromedia support fixing block 30, a plurality of double physical layer devices 43-1 and 43-2, and the system processor 41. The double physical layer devices 43-1 and 43-2 generate Media-Dependent Interface (MDI) which corresponds to the copper physical medium, e.g., a 1000BASE-T type of copper, and optical transceiver input/output signals, e.g., a 1000BASE-X type of optical transceiver, such as PMD_UNITDATA.request(T+,T−) and PMD_UNITDATA.indicate(R+,R−), and exchanges the media with another media based on the physical medium state information 304. The system processor 41 receives information on the media from the physical medium managing unit 12 and manages the system based on the link state information of the MAC 32.

FIGS. 3A and 3B are diagrams describing physical medium-dependent transceivers for the Ethernet port apparatus supporting multiple physical media in accordance with an embodiment of the present invention. The two types of the physical medium-dependent transceiver 22 form different types of sub-board function block 20, individually. A user can make a choice between the two types of sub-board function blocks 20 according to the type of the media and use it for his/her intended purpose.

The physical medium-dependent transceivers 22-1 and 22-2 include module managing units 221 and 223 that generate a module attachment/detachment information signal and a module medium type information signal. The module attachment/detachment information signal occupies one bit. The module managing units 221 and 223 are designed to output a logic value '0' to the physical medium managing unit 12 of the main board function block 10, when a module is set up and output a logic value '1' when the module is not set up.

Herein, the module managing units 221 and 223 are designed to select and allocate a value comfortable for design among logic values '0' and '1' for the module medium type information signal when the media attached to the module is copper and, in case where the physical medium is optical cable, allocate the other value.

P(1:L) denotes the number of ports that can be attached to one sub-board function block 20. Herein, 1 to L ports can be mounted thereon.

FIG. 3A shows the physical medium-dependent transceiver 22-1 for a copper physical medium. P(1:L)_SI_TD_+, P(1:L)_SI_TD_−, P(1:L)_SI_RD_+, P(1:L)_SI_RD_−, P(1:L)_optical transceiver control bitstream, and P(1:N)_optical transceiver_state information bitstream are signals used when the physical medium is optical cable. Thus, pins coming out of the heteromedia support fixing block 30 are all in a floating state. P(1:L)_BI_DA+, P(1:L)_BI_DA−, P(1:L) BI_DB+, P(1:L)_BI_DB−, P(1:L)_BI_DC+, P(1:L)_BI_DC−, P(1:L)_BI_DD+, and P(1:L)_BI_DD− are connected to L copper media dependent interface (MDI) connectors 222 to be linked with the physical medium, which is copper cable.

FIG. 3B shows the physical medium-dependent transceiver 22-2 for optical cable. Since bitstreams P(1:L)_BI_DA+, P(1:L)_BI_DA−, P(1:L)_BI_DB+, P(1:L)_BI_DB−, P(1:L)_BI_DC+, P(1:L)_BI_DC−, P(1:L)_BI_DD+, and P(1:L)_BI_DD− are for the copper cable, they remain floating. P(1:L)_SI_TD_+, P(1:L)_SI_TD_−, P(1:L)_SI_RD_+, P(1:L)_SI_RD_−, P(1:L)_optical transceiver control bitstream, and P(1:N)_optical transceiver_state information bitstream manage control and state information of the optical transceiver by being connected to L optical transceivers 224, and they are converted into proper optical signals through optical-electric conversion and supplied to the optical cable.

As described above, L denotes the number of ports per module in a sub-board function block 20, and M denotes the number of sub-board function blocks 20 that can be connected to one main board function block 10, while N denotes the total number of ports in a main board function block 10. The relationship between L, M and N is 'N=L×M.'

Figure 4:
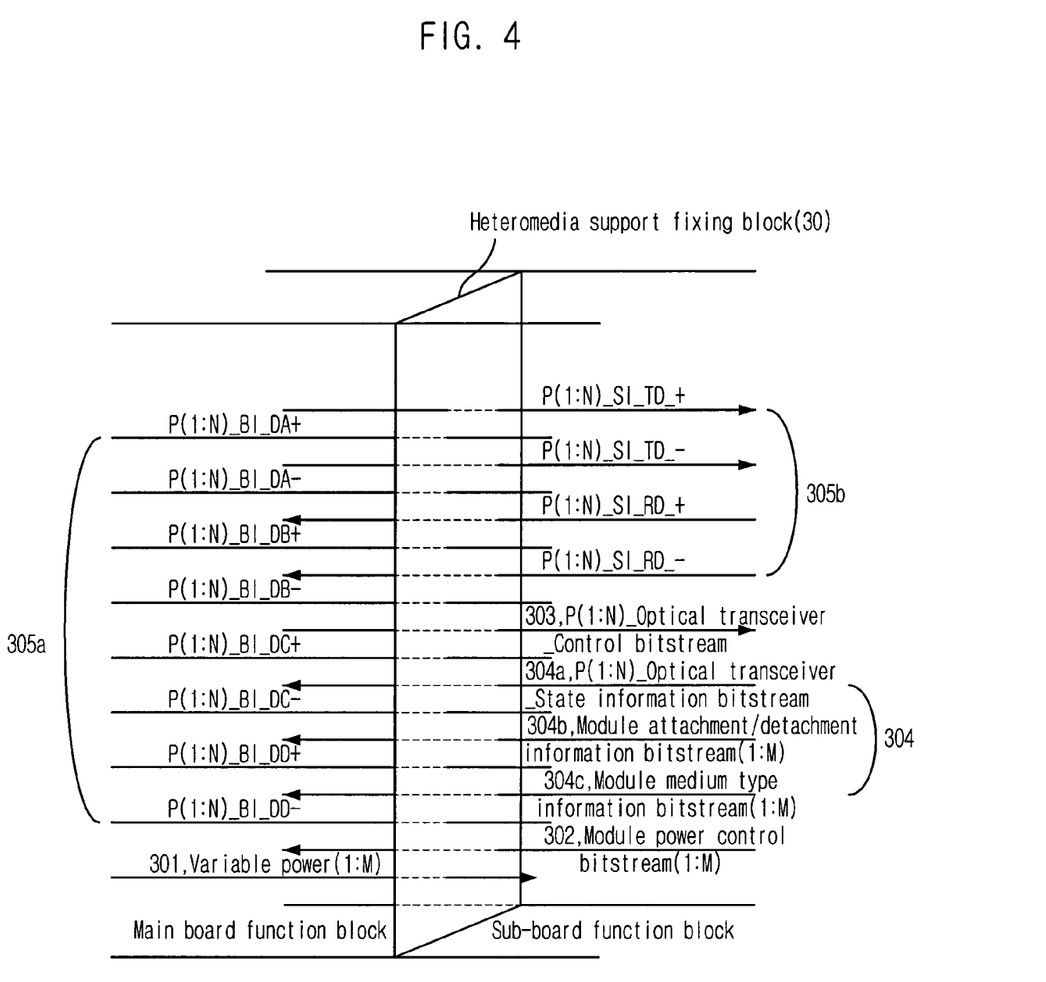
FIG. 4 is a diagram describing a heteromedia support fixing block of the Ethernet port apparatus supporting multiple physical media in accordance with an embodiment of the present invention.

FIG. 4 is a diagram describing a heteromedia support fixing block of the Ethernet port apparatus supporting multiple media in accordance with an embodiment of the present invention. Bitstreams needed for N ports are allocated to a connector.

As shown in FIG. 4, bitstreams 305a, i.e., P(1:N)_BI_DA+, P(1:N)_BI_DA−, P(1:N)_BI_DB+, P(1:N)_BI_DB−, P(1:N)_BI_DC+, P(1:N)_BI_DC−, P(1:N)_BI_DD+, and P(1:N)_BI_DD−, are expanded forms of BI_DA+, BI_DA−, BI_DB+, BI_DB−, BI_DC+, BI_DC−, BI_DD+, and BI_DD−. Thus, P(1:N) signifies that 1 to N ports can exist. Therefore, the heteromedia support fixing block 30 should include N×8 fixing pins to support N copper media-dependent interfaces.

The bitstreams 305b, i.e., P(1:N)_SI_TD_+, P(1:N)_SI_TD_−, P(1:N)_SI_RD_+, P(1:N)_SI_RD_−, are for an optical transceiver of an Ethernet. They correspond to input/output signals PMD_UNITDATA.request(T+,T−) and PMD_UNITDATA.indicate (R+,R−) to/from the optical transceiver, and they denote two pairs of input/output differential signals, i.e., a total of four pins per port.

Also, P(1:N)_optical transceiver control bitstream 303 is a signal that can turn on/off the output of an optical signal from the optical transceiver.

Also, P(1:N)_optical transceiver_state information bitstream 304a includes a signal for detecting an error in transmission and reception of the optical transmitter in each port, a signal for determining whether or not there is an optical signal reaching the optical transceiver, and an optical transceiver attachment/detachment signal.

Module attachment/detachment information bitstream 304b and module physical medium type information bitstream 304c, which are additional signals for modulation based on the type of a physical medium in the present invention, have as many pins as the number (M) of the sub-board function blocks 20 and they connects the main board function block 10 and the sub-board function blocks 20 through the heteromedia support fixing block 30. Signals related to modulation need to exist only one per module not port. If M modules compose a system, M signals related to the M modules are needed.

Herein, the module attachment/detachment information bitstream 304b and the module physical medium type information bitstream 304c occupies one bit. The module attachment/detachment information bitstream 304b informs the physical medium managing unit 12 of whether a module is attached, while the module physical medium type information bitstream 304c informs the physical medium managing unit 12 of whether the physical medium of the current port is optical cable or copper.

Since the level of power is different according to a physical medium, the variable sub-board power source 301 and the module power control signal 302 applies a proper level of power to the sub-board function blocks 20.

For hot swap, the heteromedia support fixing block 30 should always be designed to have a ground of the variable power connected prior to a power source and bitstreams.

Physically, the heteromedia support fixing block 30 is a combination of two male and female connectors that can be engaged with the main board function block 10 and the sub-board function blocks 20. The combination satisfies a condition of M=N/L, wherein L denotes the number of ports supported by an individual sub-board function block 20 and M denotes the number of sub-board function blocks 20 that can be connected to one main board function block 10, while N denotes the total number of ports supported in a main board function block 10.

Figure 5:
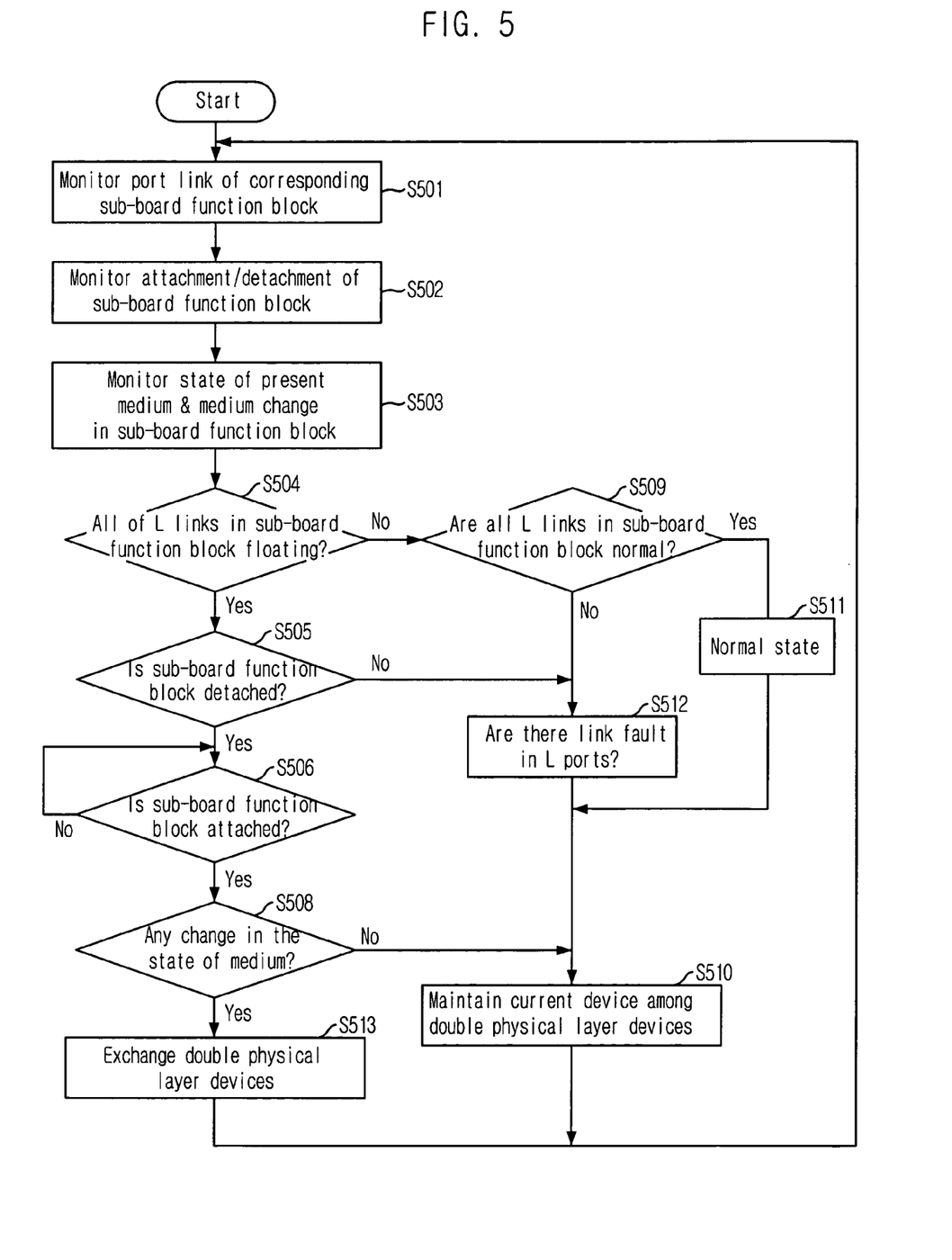
FIG. 5 is a flowchart describing a method for managing a medium in the Ethernet port apparatus supporting multiple physical media in accordance with an embodiment of the present invention.

FIG. 5 is a flowchart describing a method for managing a physical medium in the Ethernet port apparatus supporting multiple media in accordance with an embodiment of the present invention. The drawing describes a physical medium managing process realized in the form of logic in the physical medium managing unit 12 of the main board function block 10. It shows a method for managing a physical medium with respect to an individual sub-board function block 20, and all sub-board function blocks 20 follow the process.

First, at steps S501 to S503, the physical medium managing unit 12 monitors a link state with each port in a sub-board function block 20, whether a module is attached, the type and state of a current physical medium, and whether the physical medium is exchanged with another type of a physical medium.

At step S504, when there is a change in the states, at step S504, it is checked whether the L links of the sub-board function block 20 are all floating.

If the L links of the sub-board function block 20 are all floating, at step S505, it is checked whether the sub-board function block 20 is detached from the system main board. If the sub-board function block 20 is attached to the system main board, it means a link fault of a port due to a problem in the main board means and/or the sub-board means, which is a step S512. Thus, at step S510, there is no change in the physical medium and the double physical layer devices 43-1 and 43-2 remain the same.

At the step S505, if the L links of the sub-board function block 20 are all floating and the sub-board function block 20 is detached from the main board, at step S506, the process waits until the sub-board function block 20 is attached again. At step S508, it is checked whether the state of the physical medium is changed and if there is a change, at step S513, the system processor 41 is requested to convert the double physical layer devices 43-1 and 43-2. Herein, if there is no change at the step S508, at step S510, the double physical layer devices 43-1 and 43-2 remain the same because the sub-board function block 20 is simply re-attached after detachment.

The detachment of the module means severance of all links, and the module is not detached in terms of hardware unless the links of the L ports are all fault. Therefore, if at least one link among the L links of the sub-board function block 20 is in the state of connection at the step S504, it means that there is a temporal abnormality in the links and the links are recovered to the normal state at step S511 or it means that there is a fault in some of the links at step S512. Thus, at step S510, the double physical layer devices 43-1 and 43-2 remain the same.

The physical medium managing method, which is suggested in the present invention, can be realized as a program and stored in a computer-readable recording medium, such as CD-ROM, RAM, ROM, floppy disks, hard disks and magneto-optical disks. Since the process can be easily implemented by those of ordinary skill in the art where the present invention belongs, further description on it will not be provided herein.

As described above, the technology of the present invention can apply a physical medium desired and managed by a user optionally by simultaneously supporting characteristics of two different media and making it possible to exchange the media. Thus, it has an effect of attaching the copper physical medium which supports a variety of rates to one system as well as attaching the optical transceiver which supports a variety of ranges.

Also, the technology of the present invention can provide hot swap for media exchange and the media exchange can be carried out in the middle of system operation. Therefore, a user can select a desired medium.

Conventionally, a new system should be designed to apply an existing system with a fixed physical medium to a new area. However, the technology of the present invention can expand the application area of a system into LAN, MAN and the like by overcoming the limit in the physical media and making it possible to design the system without regard to range restrictions of the physical media. In consequences, since the system of the present invention can be expanded to optical transmission of 10/100/1000G copper, and 1000GBASE-LX and 1000GBASE-SX type of optical transmitters, it can be applied in a wide range, such as LAN, MAN and Access, thus stimulating diverse demands.

The present application contains subject matter related to Korean patent application No. 2004-100658, filed in the Korean Intellectual Property Office on Dec. 2, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An Ethernet port apparatus supporting multiple physical media, comprising: a main board means for supporting hot swap and power supply based on a physical medium among multiple physical media and managing the state of the media and performing media exchange by collecting and managing transmission/reception characteristics and states of the physical medium; a detachable physical medium-based sub-board means for generating a control signal based on the physical medium to determine a level of power, transmitting the control signal to the main board means, performing a transceiving function suitable for the physical medium desired by a system user, and informing the state of the physical medium to the main board means; and a physical medium support fixing means for transmitting variable power, a power control signal, a physical medium control signal, a physical medium state information, and physical medium-dependent bitstream between the main board means and the sub-board means in order to support multiple physical media transmission interface.

2. The Ethernet port apparatus as recited in claim 1, wherein the main board means includes: a variable power source for supplying different voltages of variable power as many as the sub-board means according to a corresponding physical medium and a power control signal that provides a signal level of an individual sub-board means as a determination ground, and for supporting hot swap; and a physical medium managing unit having a processor interface for collecting transmission/reception characteristics and state of the physical medium based on physical medium state information and managing the physical medium based on the physical medium control signal.

3. The Ethernet port apparatus as recited in claim 2, wherein each sub-board means includes: a power control unit for generating a power control signal for controlling the variable power source according to the physical medium in the main board means through the physical medium support fixing means to provide a proper level of power to the physical medium; and a physical medium-dependent transceiver for converting input bitstream into signals suitable for the physical medium and vice versa by the physical medium-dependent bitstream and the physical medium control signal.

4. The Ethernet port apparatus as recited in claim 2, wherein each sub-board means includes: a sub-board function block for copper that has a plurality of MDI connectors for copper, connecting the MDI connectors to media-dependent interface corresponding to copper, and floating the input/output signals of an optical transceiver, optical transceiver control bitstream, and optical transceiver state information bitstream; or a sub-board function block for optical cable that has a plurality of optical transceivers, connecting the input/output signals of an optical transceiver, which is a 1000BASE-X type of optical transceiver, optical transceiver control bitstream, and optical transceiver state information bitstream and floating the MDI connectors to media-dependent interface corresponding to copper and a module managing unit for generating a module attachment/detachment information signal indicating whether the sub-board means is in the state of attachment or detachment and a module medium type information signal indicating whether the sub-board means is for optical case or copper.

5. The Ethernet port apparatus as recited in claim 1, wherein the physical medium support fixing means is a combination of Media Dependent Interfaces, which correspond to a copper physical medium, variable power sources connected to the main board means with physical medium dependent bitstream, optical transceiver control bitstream, and optical transceiver state information bitstream including PMD_UNITDATA. request(T+,T−) and PMD_UNITDATA. indicate(R+,R−), which are input/output signals of the optical transceiver, and two male and female connectors that can connect a module attachment/detachment information signal, a module physical medium type information bitstream, and a module power control signal with the main board means and the sub-board means, wherein the number of the Media Dependent Interfaces is the same as the number (N) of ports supported in the system and the number of the variable power sources is the same as the number (M) of the sub-board means; and the combination satisfies a condition of 'M=N/L', L being the number ports per module of a sub-board means, M being the number of sub-board means that can be connected to one man board means, and N being the total number of ports supported by one main board means.

6. A switching system including an Ethernet port apparatus which supports multiple physical media, comprising: N Ethernet Media Access Control (MAC), which are switches or routers, N being an integer; N multiple physical layer devices; and a system managing means for receiving information on a physical medium from the N multiple physical layer devices which perform media exchange based on physical layer state information and from the main board means, determining whether to operate the N multiple physical layer devices based on link state information of the N Ethernet MACs, and managing the physical medium and the state of the physical medium, wherein there are M detachable sub-board means, and each sub-board means has 'N/M=L' ports, and a desired type of physical media is selected and used as many as the ports, L being a number of ports per module of a sub-board means, M being an integer and the number of sub-board means that can be connected to one main board means, and N being a total number of ports supported by one main board means.

7. The switching system as recited in claim 6, wherein the N multiple physical layer devices generate media dependent interface (MDI) which corresponds to copper, and which is the physical medium-dependent bitstream, and generate PMD_UNITDATA. request(T+,T−) and PMD_UNITDATA. indicate(R+,R−), which are input/output signals of an optical transmitter, and the N multiple physical layer devices perform media exchange based on physical layer state information.

8. The switching system as recited in claim 6, wherein each sub-board means includes any one among: a sub-board function block for copper which has a plurality of media-dependent interface connectors for copper built therein, fixes the media dependent interface corresponding to copper, with the connectors, and makes input/output signals of the optical transceiver, optical transceiver control bitstream and optical transceiver state information bitstream remain floating; and a sub-board function block for optical cable which has a plurality of optical transceivers, fixes input/output signals of the optical transceivers, optical transceiver control bitstream, and optical transceiver state information bitstream, and makes the media dependent interface corresponding to copper, remain floating, and each sub-board means receives physical medium-dependent bitstream from the main board means, re-transmits the physical medium-dependent bitstream when the physical medium is copper or transmits an optical signal by performing optical-electric conversion when the physical medium is the optical transceiver.

9. A method for managing a physical medium in an Ethernet port apparatus supporting multiple physical media, comprising the steps of: a) monitoring a link state of each port of a sub-board means, a module attachment/detachment state, a type and state of a current physical medium, and whether the physical medium is exchanged with another physical medium and, if there is a change during the monitoring, checking the link state with the sub-board means; b) if the link with the sub-board means is floating, checking whether the sub-board means is detached from the main board means; c) if the sub-board means is not detached from the main board means, determining there is no change in the physical medium and maintaining a double physical layer device; d) if the sub-board means is detached from the main board means, waiting until the sub-board means is attached again and, if there is a change in the state of the physical medium, requesting a system processor for switching of a double physical layer device or, if there is no change in the state of the physical medium, maintaining the double physical layer device the same; and e) if at least one link is fixed, maintaining the double physical layer device the same.

* * * * *